(12) United States Patent
Oliver et al.

(10) Patent No.: US 7,452,305 B2
(45) Date of Patent: Nov. 18, 2008

(54) DRIVELINE TORQUE REDUCER

(75) Inventors: James L. Oliver, Orion, MI (US); Craig S. Jacobs, Canton, MI (US); David M. Preston, Clarkston, MI (US); Timothy J. Morscheck, Kalamazoo, MI (US); Jeff H. Skorupski, Kalamazoo, MI (US); Thomas A. Genise, Dearborn, MI (US)

(73) Assignee: Eaton Corporation, Cleveland, OH (US)

( * ) Notice: Subject to any disclaimer, the term of this patent is extended or adjusted under 35 U.S.C. 154(b) by 295 days.

(21) Appl. No.: 11/047,349

(22) Filed: Jan. 28, 2005

(65) Prior Publication Data

US 2006/0172849 A1   Aug. 3, 2006

(51) Int. Cl.
*F16H 1/28* (2006.01)
(52) U.S. Cl. ...................... 475/331; 475/214
(58) Field of Classification Search ............... 475/311, 475/214, 282, 331, 201, 150, 312
See application file for complete search history.

(56) References Cited

U.S. PATENT DOCUMENTS

| | | | | |
|---|---|---|---|---|
| 1,861,482 A | * | 6/1932 | Sifton | 475/312 |
| 1,865,648 A | * | 7/1932 | Sifton et al. | 475/312 |
| 2,890,603 A | * | 6/1959 | Miller et al. | 475/134 |
| 6,217,475 B1 | * | 4/2001 | Shih | 475/269 |
| 6,406,400 B1 | * | 6/2002 | Shih | 475/207 |
| 6,537,169 B1 | * | 3/2003 | Morii | 475/8 |
| 6,979,275 B2 | * | 12/2005 | Hiraku et al. | 475/214 |
| 2004/0254045 A1 | * | 12/2004 | McGee et al. | 477/3 |

* cited by examiner

*Primary Examiner*—Sherry Estremsky
(74) *Attorney, Agent, or Firm*—Rader, Fishman & Grauer PLLC

(57) ABSTRACT

A vehicular powertrain system includes a prime mover having an output, a multi-ratio transmission having an input, and a torque reduction coupling system coupling the prime mover output and the multi-ratio transmission input. The exemplary torque reduction coupling system includes a clutch and a planetary gear set selectively coupling the prime mover output to the multi-ratio transmission input. The exemplary planetary gear set includes one components of the planetary gear set being selectively coupled to the clutch.

29 Claims, 4 Drawing Sheets

DRIVELINE TORQUE REDUCER

BACKGROUND

The present system and method relate generally to vehicular drivelines. More specifically, the present system and method relate to reducing the torque transferred from an engine to a transmission portion of a vehicular driveline.

Automobile manufacturers are constantly working to improve fuel efficiency in motor vehicles. Improvements in fuel efficiency for larger vehicles, such as vehicles that incorporate diesel or other large engines, often translate to a reduction in the engine speed. Consequently, recent developments in the design of vehicular drivelines for larger vehicles have resulted in drivelines exhibiting relatively low engine speeds.

While a reduction in engine speed does increase fuel efficiency in larger vehicles, the decrease in engine speed takes a toll on driveline components. For example, a reduction in engine speed results in a corresponding increase in torque transferred through the driveline. Prior art powertrain systems were not sized to handle the maximum torque loading that often occurs at low-speed operation. Specifically, the effective life of transmissions associated with traditional powertrain systems is reduced as a result of the lower engine speeds. Consequently, current drivelines for larger vehicles are often limited in horsepower output by the amount of torque that can be handled by the powertrain transmission. Additionally, the increase in torque provided by the engines operating at lower speeds increased the amount of torque absorbed by the powertrain clutches during shift events. That is, with an increase in powertrain torque, engagement of a powertrain clutch meant transferring an increased amount of torque to the clutch, causing increased wear and lower effective life.

SUMMARY

A vehicular powertrain system includes a prime mover having an output, a multi-ratio transmission having an input, and a torque reduction coupling system coupling the prime mover output and the multi-ratio transmission input. The exemplary torque reduction coupling system includes a clutch and a planetary gear set selectively coupling the prime mover output to the multi-ratio transmission input. The exemplary planetary gear set includes a gear selectively coupled to the clutch.

An exemplary method of operating a vehicular powertrain system includes selecting a first prime mover having an output, providing a multi-ratio transmission having an input, incorporating a torque reduction coupling system coupling the prime mover output and the multi-ratio transmission input, and disengaging the clutch in preparation of a shift event. The torque reduction coupling system includes a clutch and a planetary gear set configured to selectively couple the prime mover output to the multi-ratio transmission input, the planetary gear set including a gear selectively coupled to the clutch.

BRIEF DESCRIPTION OF THE DRAWINGS

Embodiments of the present system and method will now be described, by way of example, with reference to the accompanying drawings, wherein.

Throughout the drawings, identical reference numbers designate similar, but not necessarily identical, elements.

DETAILED DESCRIPTION

Figure 1:
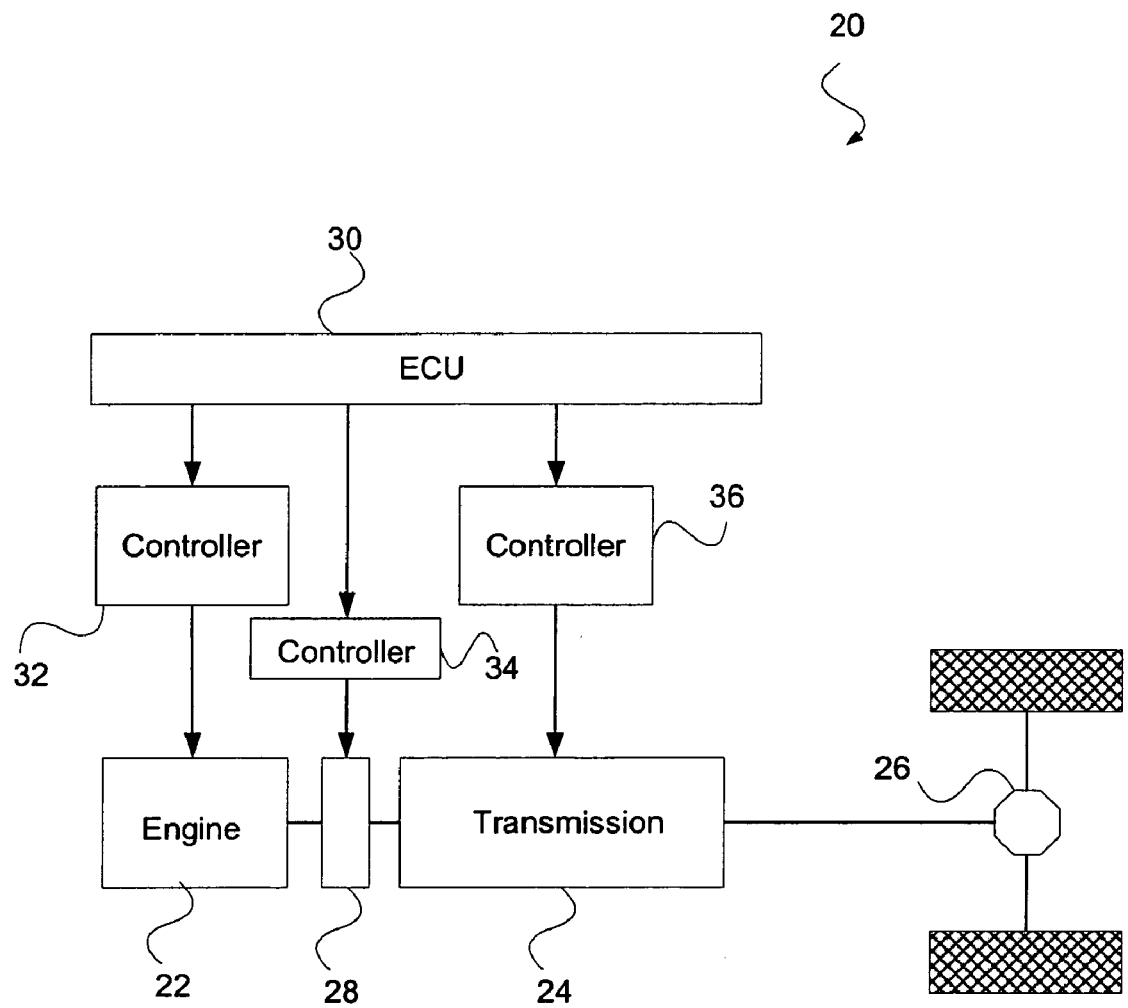
FIG. 1 is a schematic view of a multiple ratio power-train system, according to one exemplary embodiment.

Referring to FIG. 1, a multiple ratio powertrain system 20 is shown in accordance with an embodiment of the present system and method. In the illustrated embodiment, powertrain system 20 includes a prime mover 22, such as a spark-ignited or compression-ignited internal combustion engine coupled to a multi-ratio transmission 24, which is subsequently coupled to an axle 26. Additionally, as illustrated in FIG. 1, a torque reduction coupling system 28 is disposed between the prime mover 22 and the multi-ratio transmission 24. FIG. 1 further illustrates an electronic control unit 30, as well as an engine controller 32, a torque reduction coupling system controller 34, and a transmission controller 36 operatively coupled to corresponding components of the powertrain system 20. Further details of the exemplary multiple ratio powertrain system 20 illustrated in FIG. 1 are provided below.

As illustrated in FIG. 1, the exemplary powertrain system 20 may include an electronic control unit (ECU) 30 for controlling operation of the prime mover 22, the torque reduction coupling system 28, and the multi-ratio transmission 24. In one exemplary configuration, the ECU 30 includes a programmable digital computer that is configured to receive various input signals that include, without limitation, the operating speed of the prime mover 22, transmission input speed, selected transmission ratio, transmission output speed, and vehicle speed.

The ECU 30 processes these signals according to logic rules to control operation of the powertrain system 20. For example, ECU 30 may be programmed to deliver fuel to the prime mover 22 when the prime mover functions as an internal combustion engine. To support this control, each of the prime mover 22, the torque reduction coupling system 28, and the multi-ratio transmission 24 may include its own controller 32, 34, and 36, respectively. However, it will be appreciated that the present system and method are not limited to any particular type or configuration of ECU 30, controllers 32, 34, and 36, or to any specific control logic for governing operation of the multiple ratio powertrain system 20.

Continuing with FIG. 1, the prime mover 22 may be any fuel controlled engine capable of providing kinetic energy in the form of rotational movement ("rotational energy") to the multi-ratio transmission 24. According to one exemplary embodiment, the prime mover 22 is a fuel-controlled internal combustion engine such as a well-known diesel engine or the like. Alternatively, the prime mover 22 may be an electric or pneumatic motor.

The multi-ratio transmission 24 that is configured to receive rotational energy from the prime mover 22 may include a number of interchangeable gear ratios, as found in any number of change-gear transmissions known in the art. Alternatively, the multi-ratio transmission 24 may include a less traditional power transmission system, such as a continuously variable transmission ("CVT"). As shown in FIG. 1, the output of the multi-ratio transmission 24 drives the axle of the powertrain system 20. The axle 26 of the multiple ratio powertrain system 20 may include independent gearing that may subsequently be used to modify the rotational velocity of the transmission output.

As shown in FIG. 1, the torque reduction coupling system 28 is disposed between, and rotatably couples the prime mover 22 and the multi-ratio transmission 24. According to the present exemplary embodiment, the torque reduction coupling system 28 includes a clutch and is configured to selectively provide the rotational energy from the prime mover 22 to the multi-ratio transmission 24. Further, the present torque reduction coupling system 28 is configured to reduce the torque load on the components of the multiple ratio powertrain system 20, thereby enhancing the life of both the clutch and the multi-ratio transmission.

Figure 2A:
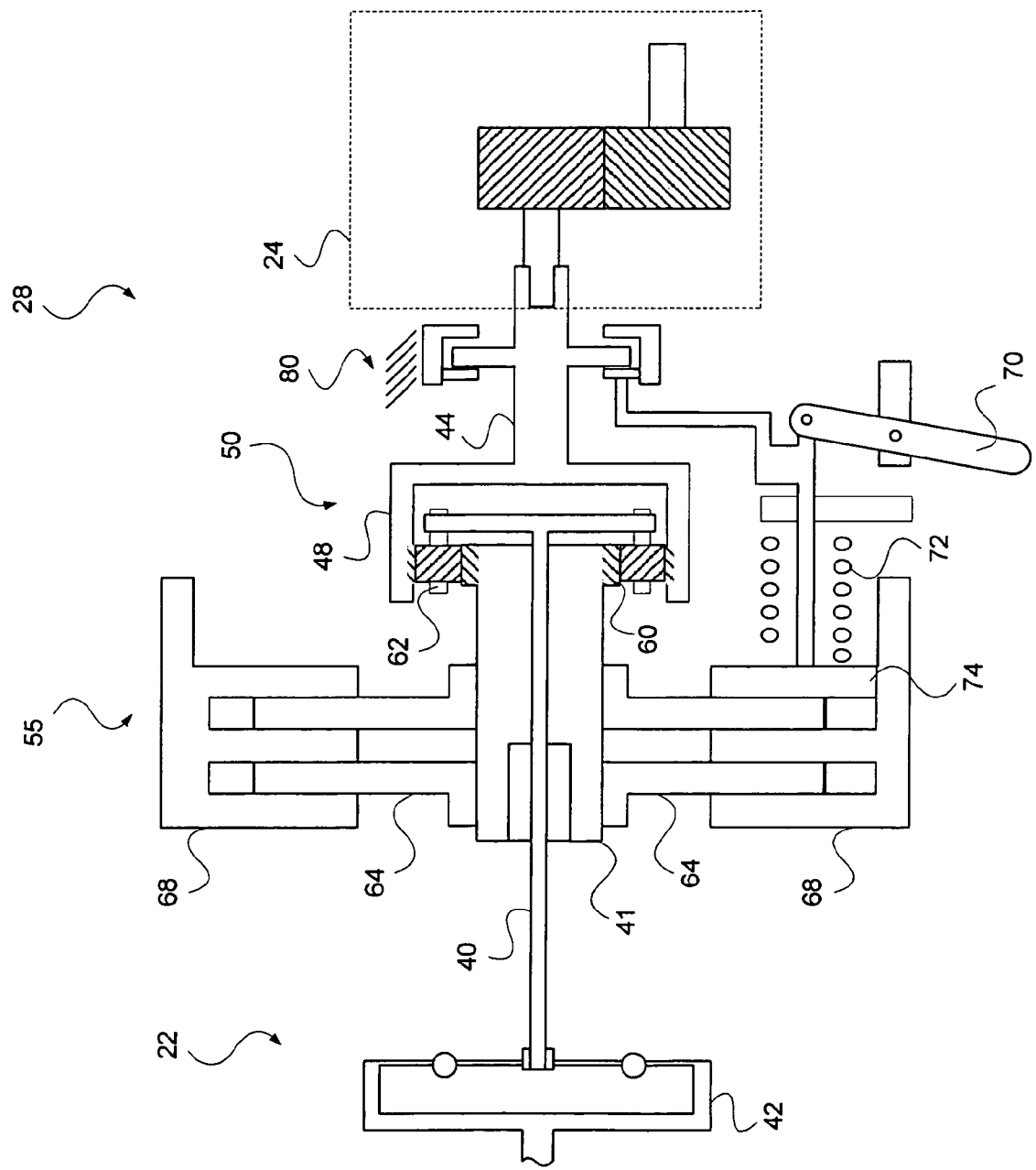
FIG. 2A is a schematic view of a torque reduction coupling system, according to one exemplary embodiment.
Figure 2B:
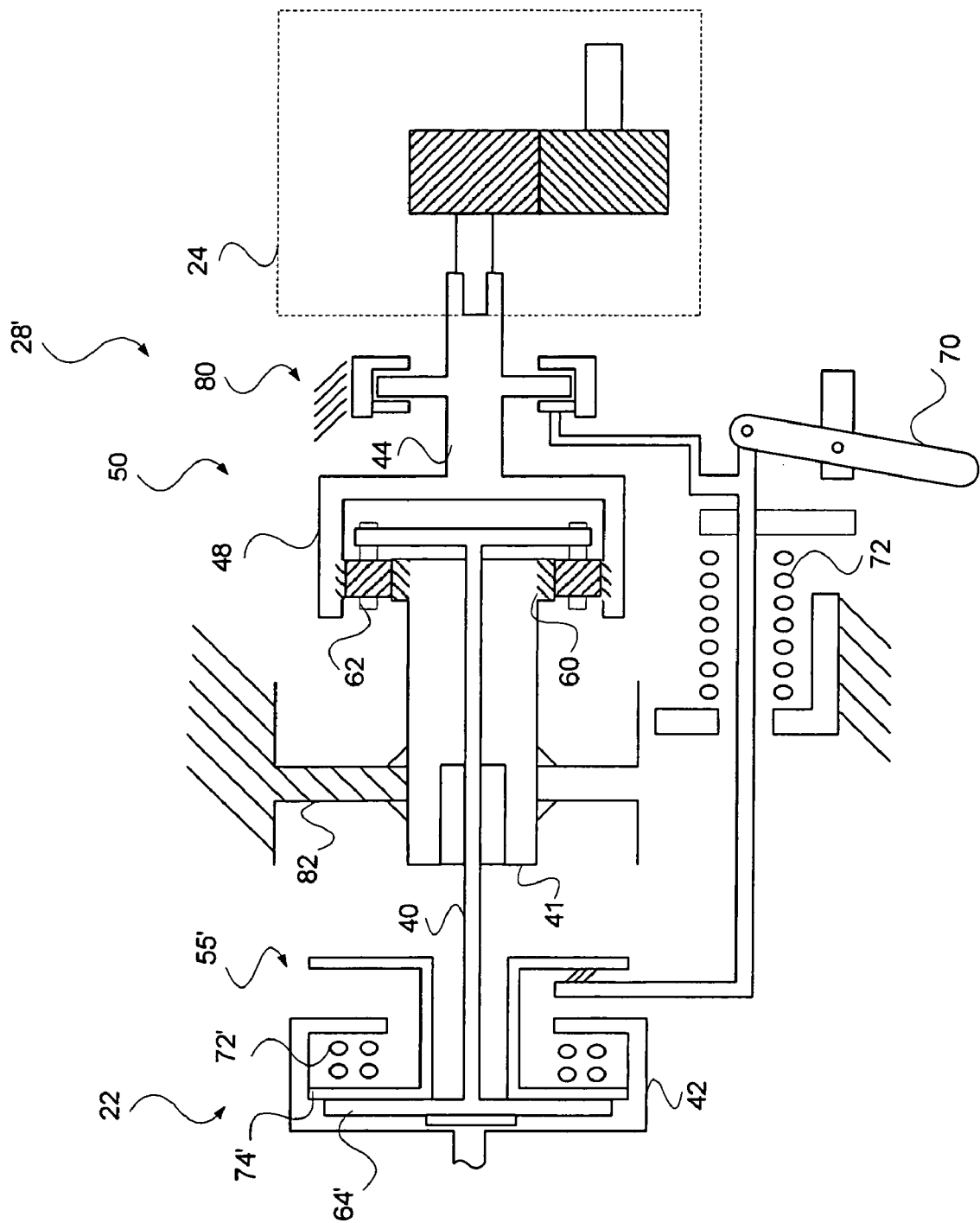
FIG. 2B is a schematic view of a torque reduction coupling system, according to a second exemplary embodiment.
Figure 3:
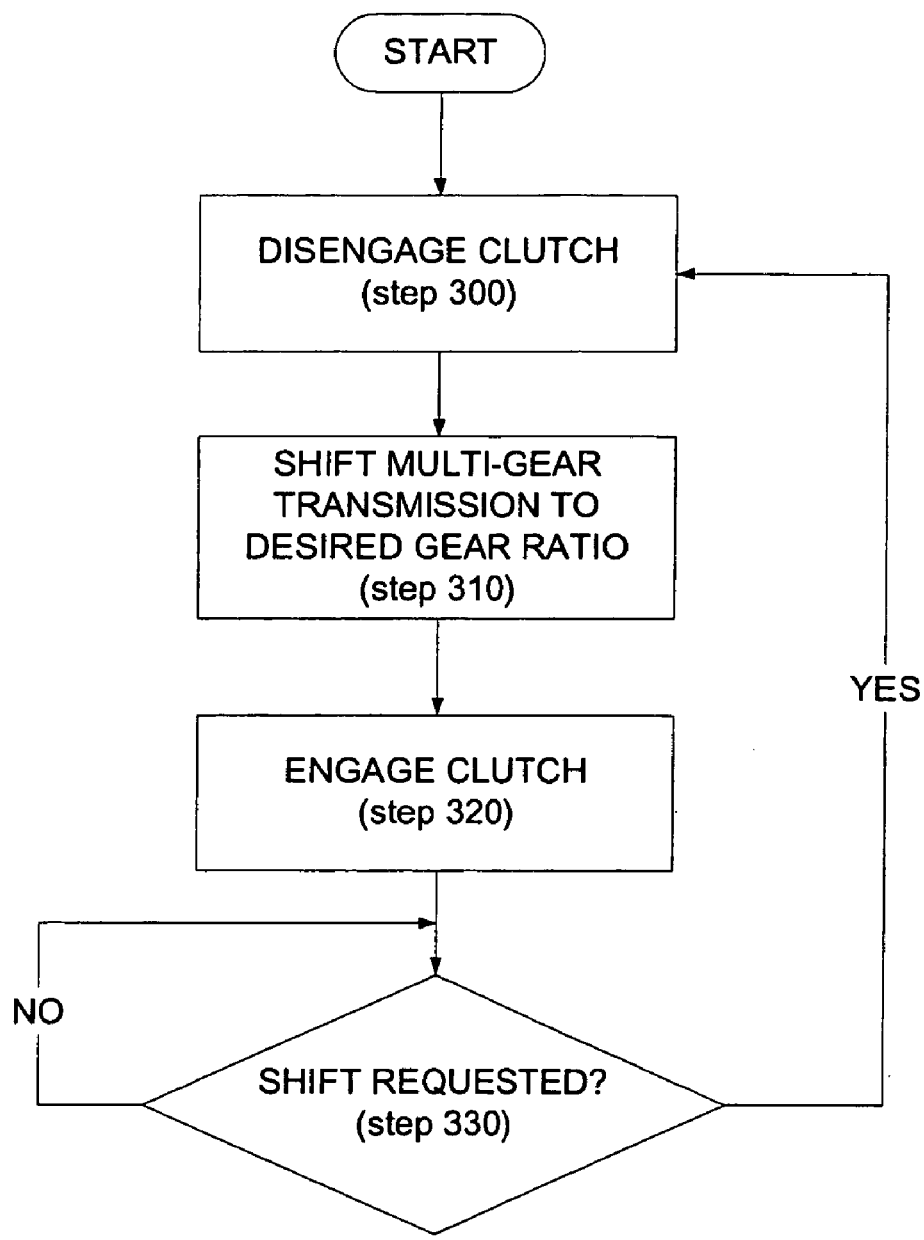
FIG. 3 is a flow chart illustrating the operation of the torque reduction coupling system, according to one exemplary embodiment.

With reference to FIGS. 2A, 2B, and 3 of the accompanying drawings, the components and function of the torque reduction coupling system 28 will be described in greater detail. According to one exemplary embodiment illustrated in FIG. 2A, the multi-ratio transmission 24 is coupled to the output of the prime mover 22 by the torque reduction coupling system 28. For the sake of illustration, the prime mover 22 is shown as an internal combustion engine in FIGS. 2A and 2B, which generally includes a flywheel 42 and a first shaft 40 coupled thereto. Similarly, the multi-ratio transmission 24 includes a transmission input shaft 44.

As shown in FIG. 2A, the torque reduction coupling system 28 includes an input in the form of the first shaft 40 that is concentrically disposed within a second shaft 41 such that both shafts may independently rotate without interference. Both the first shaft 40 and the second shaft 41 are coupled to a planetary gear set 50. The exemplary planetary gear set 50 illustrated in FIG. 2A is configured to selectively couple the first shaft 40 and the second shaft 41 to the transmission input shaft 44. According to the exemplary embodiment illustrated in FIG. 2A, the first shaft terminates with a plurality of overdrive planetary gears 62 that form a part of the planetary gear set 50. Additionally, the sun gear 60 component of the planetary gear set 50 is formed on a first portion of the second shaft 41. The ring gear 48 is coupled to the transmission input shaft 44 that leads to the multi-ratio transmission 24.

According to the exemplary embodiment illustrated in FIG. 2A, the second shaft 41 includes a sun gear 60 of the planetary gear set 50 formed thereon for rotation therewith. The outer surface of the sun gear 60 is meshed with the planet gears 62 that are rotatably coupled to the first shaft 40 and the flywheel 42. Additionally, as illustrated in FIG. 2A, a ring gear 48 is meshed with the outer surface of the planetary gears 62 to complete the planetary gear set 50. The ring gear 48 is coupled to the transmission input shaft 44 that leads to the multi-ratio transmission 24 of the present exemplary multi-ratio transmission 24. As noted previously, the multi-ratio transmission 24 may include a number of interchangeable gear ratios, such as a change-gear transmission or a continuously variable transmission.

Continuing with FIG. 2A, the second shaft 41 is coupled to a clutch system 55 through one or more clutch flanges 64 that are formed on a second portion of the second shaft 41. According to one exemplary embodiment, the clutch flanges 64 are configured to interact with a clutch body 68 and clutch face 74 of a clutch system 55, as will be described in further detail below.

The clutch system 55 that is coupled to the second shaft 41, and consequently to the sun gear 60 of the planetary gear set 50 may be any number of clutches currently known in the art such as a hydraulically or electrically operated friction clutch. As used in the present specification, and in the appended claims, the term "engaged," when mentioned with respect to a clutch, is meant to be understood as resulting in a single or bidirectional clutching action. Similarly, operation in a "disengaged" mode is meant to be understood as permitting freewheeling of the second shaft 41 or other elements in one or both rotational directions. As shown in FIG. 2A, the clutch is illustrated as having a clutch actuator 70 that is manipulated to engage and disengage the clutch system 55. The clutch actuator 70 is coupled to a clutch face 74 that creates interference between the clutch flanges 64, the clutch face 74, and the grounded clutch body 68 when the clutch actuator 70 is actuated. While the clutch actuator 70 is illustrated as a manually actuated rod and lever configuration, the clutch actuator may be any number of electric or pneumatic actuators. As shown, a biasing agent 72, such as a spring, is disposed adjacent to the clutch face 74 causing it to naturally exist in an engaged state until actuation occurs.

Additionally, as illustrated in FIG. 2A, a clutch brake 80 is coupled to the transmission input shaft 44. The clutch brake 80 may be any device used to rapidly slow the rotational speed of a transmission input shaft 44 when the clutch system 55 is engaged to facilitate the shifting of gears in the transmission 24. More specifically, upon engagement of the clutch system 55, the sun gear 60 will begin to slow due to clutch viscous drag from the clutch system 55. This reduction in rotational velocity of the sun gear 60 will cause the transmission input shaft 44, if left un-checked, to increase in rotational velocity until gear engagement is not feasible. To prevent this situation, friction elements of the clutch brake 80 are pressed against a number of extrusions formed on the transmission input shaft 44 to create frictional drag that slows the rotating transmission input shaft, thereby facilitating gear engagement. While the exemplary clutch brake 80 illustrated in FIG. 2A is shown as a mechanically actuated clutch brake 80, any number of mechanical, electrical, and/or hydraulic clutch brakes may be used with the present system and method.

Continuing with FIG. 2A, the planetary gear set 50 is arranged such that when the prime mover 22 is operating in a first angular direction, the first shaft 40 is rotated in the same first angular direction at substantially the same rate. Consequently, the planetary gears 62 are also rotated in the first angular direction at substantially the same rate. During the rotation of the planetary gears 62, the sun gear 60 may be selectively clutched to vary the output of the planetary gear set 50. According to one exemplary embodiment, the clutch system 55 is engaged to prevent rotation of the sun gear 60. When the clutch system 55 is engaged, the second shaft 41, and consequently the sun gear 60 remain relatively stationary. As a result, the rotational power from the first shaft 40 is transmitted through the planetary gear set 50 and into the ring gear 48 at a predetermined overdrive gear ratio. According to one exemplary embodiment, the planetary gears 62 are configured to provide an overdrive stepdown ratio of between approximately 1 and 2 to provide an increased rotational speed and reduced torque to both the ring gear 48 and the transmission input shaft 44. According to one embodiment, the planetary gears are a 1.5 overdrive planetary gear.

In contrast, when the clutch system 55 is disengaged, the second shaft 41 is not grounded by the clutch system 55 and the sun gear 60 is allowed to freely rotate. Consequently, the input from the prime mover 22 will be transmitted through the planetary gears 62 to the sun gear 60. According to this exemplary embodiment, disengagement of the clutch system 55 will cause the planetary gear set 50 to operate in planetary mode. That is, allowing the sun gear 60 to freely rotate causes the rotational energy input provided by the first shaft 40 to be converted into rotation of the planetary gears and rotation of the sun gear 60. As a result, no or very little energy is transferred to the ring gear 48 or the transmission input shaft 44, allowing the transmission to slow or stop rotation in preparation of a shift event or another similar transmission event. Details of the operation of the torque reduction coupling system 28 are given below with reference to FIG. 3.

FIG. 2B illustrates a torque reduction coupling system 28', according to a second exemplary embodiment. Similar to the exemplary torque reduction coupling system 28 illustrated in FIG. 2A, the second exemplary embodiment illustrated in FIG. 2B includes a prime mover output 22 selectively coupled to a multi-ratio transmission 24 by a planetary gear set 50 and clutch system 55'.

As illustrated in FIG. 2B, the second shaft 41 and the sun gear 60 of the planetary gear set 50 of the second exemplary torque reduction coupling system 28' is coupled to ground 82, thereby preventing rotation. Additionally, the first shaft 40 having the planetary gears 62 of the planetary gear set 50 formed on a first end thereof is selectively coupled to the flywheel 42 of the prime mover output 22 by a clutch system 55'. As illustrated in the second exemplary torque reduction coupling system 28', the first shaft 40 includes a number of clutch flanges 64' formed on the end thereof opposite the planetary gears 62. As shown, the clutch flanges 64' are selectively coupled to the flywheel 42 of the prime mover output 22 by the clutch system 55'.

More specifically, when the clutch system 55' is engaged, the clutch face 74' of the exemplary clutch system 55' is forced against the clutch flanges 64' by a resistive element 72', thereby coupling the clutch flanges 64' to the flywheel 42 of the prime mover output 22. As a result, rotational energy may then be transferred from the flywheel 42 of the prime mover output 22, to the planetary gear set 50 and on to the multi-ratio transmission 24 as described above.

In contrast, when the master clutch 70 is actuated, the clutch system 55' is disengaged by overcoming the force of the resistive element 72' and withdrawing the clutch face 74' from the clutch flanges 64' formed on the first shaft 40. Consequently, rotational energy is no longer transmitted from the flywheel 42 to the first shaft 40 and the planetary gear set 50 no longer drives the transmission input shaft 44. Similar to the torque reduction coupling system 28 illustrated in FIG. 2A, the second exemplary torque reduction coupling system 28' reduces the torque load on the components of the powertrain system 20. Operation of the torque reduction coupling system 28 will now be given below with reference to FIG. 3.

FIG. 3 illustrates an exemplary method for operating the multiple ratio powertrain system 20 incorporating the torque reduction coupling system 28 or 28'. As illustrated in FIG. 3, the exemplary method begins by first disengaging the clutch mechanism (step 300). According to the exemplary embodiment illustrated in FIG. 2A, the biasing agent 72 causes the engagement of the clutch system 55 absent actuation of the clutch actuator 70. Consequently, disengaging the clutch system 55 includes manipulating the clutch actuator 70. According to one exemplary embodiment, a controller 34 configured to manage the operation of the torque reduction coupling system 28 initiates a manipulation of the clutch actuator 70. Once the clutch actuator 70 is manipulated, the clutch face 74 is withdrawn from the clutch flange 64, allowing the second shaft 41 and the sun gear 60 to freely rotate. With the sun gear 60 freely rotating, the planetary gear set 50 is operating in planetary mode, reducing or eliminating the transfer of energy to the ring gear 48 and transmission input shaft 44.

Similarly, as shown in FIG. 2B, actuation of the clutch actuator 70 withdraws the clutch face 74' from the clutch flange 64'. As a result, the transfer of energy from the flywheel 42 to the transmission input shaft 44 is reduced or eliminated.

With the minimization or elimination of energy being transferred to the multi-ratio transmission 24, the multi-ratio transmission 24 may be shifted to a desired gear ratio (step 310). According to one exemplary embodiment, the automobile incorporating the multiple gear powertrain system 20 may be starting from rest by selecting a first gear ratio.

Once the desired gear ratio has been selected (step 310), the clutch system 55 or 55' is again engaged (step 320) to provide the transfer of rotational energy from the prime mover 22 to the multi-ratio transmission 24. According to the exemplary embodiment illustrated in FIG. 2A, the clutch system 55 is engaged through a manipulation of the clutch actuator 70. When the clutch actuator is again manipulated, whether manually or via a signal from the controller 34, the clutch face 74 is forced against the clutch flanges 64 and the clutch body 68. This actuation ceases the free rotation of the second shaft 41 and the sun gear 60 formed thereon, grounding the sun gear 60 to allow the transfer of rotational energy from the overdrive planetary gears 62 to the ring gear 48 and the transmission input shaft 44. Additionally, during engagement of the clutch system 55, the clutch brake 80 may be actuated to synchronize the rotational velocity of the transmission input shaft 44 with the output of the planetary gear set 50.

Traditionally, the increased torque of the prime mover 22 resulted in increased wear on transmission clutches. However, the configuration of the present torque reduction coupling systems 28 and 28' reduce the amount of torque absorbed by the clutch when engaged. More specifically, traditional clutches are typically associated with a shaft that is fixedly coupled to the fly wheel 42 of the prime mover 22. Consequently, traditional clutches absorb substantially all the torque produced by the prime mover 22 when engaged. In contrast, the present torque reduction coupling systems 28 and 28' clutch a fraction of the torque produced by the prime mover 22. Consequently, the effective life of the clutch systems is increased. According to one exemplary embodiment, the engagement and disengagement of the clutch systems 55 and 55' are automatically controlled by the electronic control unit 30 or the torque reduction coupling system controller 34.

Once the clutch is again engaged (step 320), rotational energy is transferred from the prime mover 22, through the planetary gear set 50, to the multi-ratio transmission 24. While the multiple ratio powertrain system 20 operates in this condition, the electronic control unit 30 and the various controllers 32, 34, 36 sense operating conditions to determine if another shift event is requested (step 330). According to this exemplary embodiment, if a subsequent shift event is requested (YES, step 330), including a requested shift to neutral, the method again engages the clutch (step 300) and the above process repeats. If, however, no shift event is requested (NO, step 330), the above monitoring condition continues and the multiple ratio powertrain system 20 continues to operate in its existing condition.

While the features of the present system and method are particularly suited for transitioning between operating sequences while the associated vehicle is moving, it is also possible to operate the torque reduction coupling system 28 to launch the vehicle from a state of rest.

Among other features, the torque reduction coupling system 28 may be readily installed in an existing vehicle driveline. Once installed, the present system and method provide for reducing the amount of torque experienced by the multi-ratio transmission while providing a clutch that experiences reduced torque problems.

The present exemplary system and method have been particularly shown and described with reference to the foregoing embodiments, which are merely illustrative of the best modes for carrying out the system and method. It should be understood by those skilled in the art that various alternatives to the embodiments of the system and method described herein may be employed in practicing the system and/or method, without departing from the spirit and scope thereof as defined in the following claims. It is intended that the following claims define the scope of the system and method and that the systems and methods within the scope of these claims and their equivalents be covered thereby. This description of the system and method should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A vehicular powertrain system, comprising:
    a prime mover having an output;
    a multi-ratio transmission having an input; and
    a torque reduction coupling system coupling said prime mover output and said multi-ratio transmission input;
    wherein said torque reduction coupling system includes a clutch and a planetary gear set selectively coupling said prime mover output to said multi-ratio transmission input;
    wherein one component of said planetary gear set is coupled to said clutch; and
    wherein at least one planetary gear of said planetary gear set is formed on said prime mover output.

2. The vehicular powertrain system of claim 1, wherein said planetary gear set includes a sun gear selectively coupled to said clutch.

3. The vehicular powertrain system of claim 2, wherein said planetary gear set comprises a ring gear coupled to said multi-ratio transmission input.

4. The vehicular powertrain system of claim 3, wherein said at least one planetary gear is rotatably coupled to said ring gear and to said sun gear.

5. The vehicular powertrain system of claim 4, wherein said at least one planetary gear comprises an overdrive gear system.

6. The vehicular powertrain system of claim 5, wherein said at least one planetary gear comprises a 1.5 overdrive planetary gear.

7. The vehicular powertrain system of claim 1, wherein said prime mover comprises a diesel engine.

8. The vehicular powertrain system of claim 1, wherein said multi-ratio transmission comprises one of a change gear transmission or a continuously variable transmission ("CVT").

9. The vehicular powertrain system of claim 1, wherein said clutch comprises one of a hydraulically actuated friction clutch or an electrically actuated friction clutch.

10. The vehicular powertrain system of claim 1, further comprising a biasing agent configured to maintain said clutch in an engaged state until actuated.

11. The vehicular powertrain system of claim 1, wherein actuating said clutch de-couples said prime mover output from said multi-ratio transmission input.

12. The vehicular powertrain system of claim 1, wherein said planetary gear set comprises at least one planetary gear formed on said prime mover output, wherein said at least one planetary gear is selectively coupled to said clutch.

13. The vehicular powertrain system of claim 12, wherein said planetary gear set further comprises a sun gear, wherein said sun gear is coupled to ground.

14. A vehicular powertrain system, comprising:
    a prime mover having an output;
    a multi-ratio transmission having an input; and
    a torque reduction coupling system coupling said prime mover output and said multi-ratio transmission input;
    wherein said torque reduction coupling system includes a clutch and a planetary gear set selectively coupling said prime mover output to said multi-ratio transmission input, said planetary gear set including a plurality of planetary gears formed on said prime mover output, a sun gear selectively coupled to said clutch, and a ring gear coupled to said multi-ratio transmission input.

15. The vehicular powertrain system of claim 14, wherein said plurality of planetary gears comprises an overdrive gear system.

16. The vehicular powertrain system of claim 15, wherein said plurality of planetary gears comprise overdrive planetary gears having a gear ratio of approximately 1.5.

17. The vehicular powertrain system of claim 14, wherein said prime mover comprises a fuel operated engine.

18. The vehicular powertrain system of claim 17, wherein said fuel operated engine comprises a diesel engine.

19. The vehicular powertrain system of claim 14, wherein said multi-ratio transmission comprises one of a change gear transmission or a continuously variable transmission ("CVT").

20. The vehicular powertrain system of claim 14, wherein said clutch comprises one of a hydraulically actuated friction clutch, an electrically actuated friction clutch, a dry clutch, or a wet clutch.

21. The vehicular powertrain system of claim 14, further comprising a biasing agent configured to maintain said clutch in an engaged state until actuated.

22. The vehicular powertrain system of claim 14, wherein actuating said clutch de-couples said prime mover output from said multi-ratio transmission input.

23. A vehicular powertrain system, comprising:
    a prime mover in the form of a fuel operated engine having an output;
    a multi-ratio transmission having an input, said multi-ratio transmission being one of a change gear transmission or a continuously variable transmission ("CVT"); and
    a torque reduction coupling system coupling said prime mover output and said multi-ratio transmission input;
    wherein said torque reduction coupling system includes a clutch, in the form of one of a hydraulically actuated friction clutch, an electrically actuated friction clutch, a dry clutch, or a wet clutch, and a planetary gear set selectively coupling said prime mover output to said multi-ratio transmission input, said planetary gear set including a plurality of planetary gears forming an overdrive gear system on said prime mover output, a sun gear selectively coupled to said clutch, and a ring gear coupled to said multi-ratio transmission input;
    wherein actuating said clutch de-couples said prime mover output from said multi-ratio transmission input.

24. The vehicular powertrain system of claim 23, wherein said plurality of planetary gears comprise overdrive planetary gears having a gear ratio of approximately 1.5.

25. The vehicular powertrain system of claim 23, wherein said fuel operated engine comprises a diesel engine.

26. The vehicular powertrain system of claim 23, further comprising a biasing agent configured to maintain said clutch in an engaged state until actuated.

27. A method for operating a multi-ratio powertrain system comprising:
    selecting a first prime mover having an output;

providing a multi-ratio transmission having an input;
incorporating a torque reduction coupling system coupling said prime mover output and said multi-ratio transmission input, said torque reduction coupling system including a clutch and a planetary gear set selectively coupling said prime mover output to said multi-ratio transmission input, wherein one component of said planetary gear set is selectively coupled to said clutch and wherein at least one planetary gear of said planetary gear set is formed on said first prime mover output; and
disengaging said clutch in preparation of a shift event.

28. The method of operating a multi-ratio powertrain system of claim 27, further comprising:
disengaging said clutch;
selecting an initial launching gear-ratio; and
engaging said clutch to transfer power to said launching gear-ratio.

29. A vehicular powertrain system, comprising:
a prime mover having an output:
a multi-ratio transmission having an input; and
a torque reduction coupling system coupling said prime mover output and said multi-ratio transmission input;
wherein said torque reduction coupling system includes a clutch and a planetary gear set selectively coupling said prime mover output to said multi-ratio transmission input;
wherein one component of said planetary gear set is coupled to said clutch;
wherein at least one planetary gear of said planetary gear set is formed on said prime mover output; and
wherein said clutch comprises a wet clutch.

* * * * *